(12) United States Patent
Lee et al.

(10) Patent No.: US 10,263,548 B2
(45) Date of Patent: Apr. 16, 2019

(54) METHOD AND SYSTEM FOR FEEDBACK-CONTROLLING

(71) Applicants: Hyundai Motor Company, Seoul (KR); Kia Motors Corporation, Seoul (KR)

(72) Inventors: Dong Hun Lee, Anyang-si (KR); Keun Bong Ham, Yongin-si (KR); Chang Ha Lee, Yongin-si (KR); Kyoung Ku Ha, Anyang-si (KR); Min Su Kang, Paju-si (KR); Chang Seok You, Anyang-si (KR); Sung Do Kim, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/835,074

(22) Filed: Dec. 7, 2017

(65) Prior Publication Data

US 2019/0074785 A1     Mar. 7, 2019

(30) Foreign Application Priority Data

Sep. 1, 2017    (KR) ........................ 10-2017-0112033

(51) Int. Cl.
| | |
|---|---|
| H02M 7/48 | (2007.01) |
| H02P 7/298 | (2016.01) |
| H02M 1/14 | (2006.01) |
| B62D 5/04 | (2006.01) |
| H02M 1/32 | (2007.01) |
| F02D 41/22 | (2006.01) |

(52) U.S. Cl.
CPC ............ *H02P 7/2985* (2013.01); *B62D 5/046* (2013.01); *H02M 1/14* (2013.01); *H02M 1/32* (2013.01); *F02D 41/221* (2013.01)

(58) Field of Classification Search
CPC .......... H02M 7/42; H02M 7/48; H02M 7/525; H02M 7/527; H02M 7/529; H02M 7/53854; H02M 7/53862; H02M 7/5395
USPC .................... 363/40, 41, 95, 96, 97, 98, 120
See application file for complete search history.

(56) References Cited

U.S. PATENT DOCUMENTS

2003/0090231 A1*   5/2003   Yoshimoto .............. H02P 21/22
                                                                                                                            318/635
2004/0239278 A1*   12/2004   Kobayashi ................ H02P 6/04
                                                                                                                            318/599

(Continued)

FOREIGN PATENT DOCUMENTS

| KR | 20140073735 A | 6/2014 |
|---|---|---|
| KR | 20150026265 A | 3/2015 |

*Primary Examiner* — Alex Torres-Rivera
(74) *Attorney, Agent, or Firm* — Slater Matsil, LLP

(57) ABSTRACT

Disclosed are a method and a system for feedback-controlling including controlling a current supply unit in a controller so that an output applied to a driving unit from the current supply unit is repeatedly turned on/off by predetermined period and duty. The method also includes feedback-controlling of an output value of the controller applied to the current supply unit from the controller so that the output of the current supply unit follows a target value. The feedback-controlling includes an integration control process and stops the integration control process in the period that the current supply unit turns off the output thereof.

15 Claims, 3 Drawing Sheets

(56) References Cited

U.S. PATENT DOCUMENTS

| | | | |
|---|---|---|---|
| 2005/0162111 A1* | 7/2005 | Tsutsui | G05B 19/19 |
| | | | 318/434 |
| 2006/0279241 A1* | 12/2006 | Tsutsui | H02P 23/18 |
| | | | 318/434 |
| 2007/0274107 A1* | 11/2007 | Garner | H02M 3/33523 |
| | | | 363/21.12 |
| 2008/0252245 A1* | 10/2008 | Chen | H02P 6/16 |
| | | | 318/434 |
| 2010/0039057 A1* | 2/2010 | Tsai | H02P 7/2805 |
| | | | 318/434 |
| 2011/0227515 A1* | 9/2011 | Imura | H02P 21/0003 |
| | | | 318/400.01 |
| 2014/0049202 A1* | 2/2014 | Fukumaru | H02P 21/24 |
| | | | 318/400.32 |
| 2014/0157819 A1 | 6/2014 | Koo et al. | |
| 2014/0175872 A1* | 6/2014 | Morii | B60L 7/14 |
| | | | 307/10.1 |
| 2015/0085539 A1* | 3/2015 | Ueda | H02H 5/04 |
| | | | 363/56.01 |
| 2017/0253269 A1* | 9/2017 | Kanekawa | B62D 6/00 |

\* cited by examiner

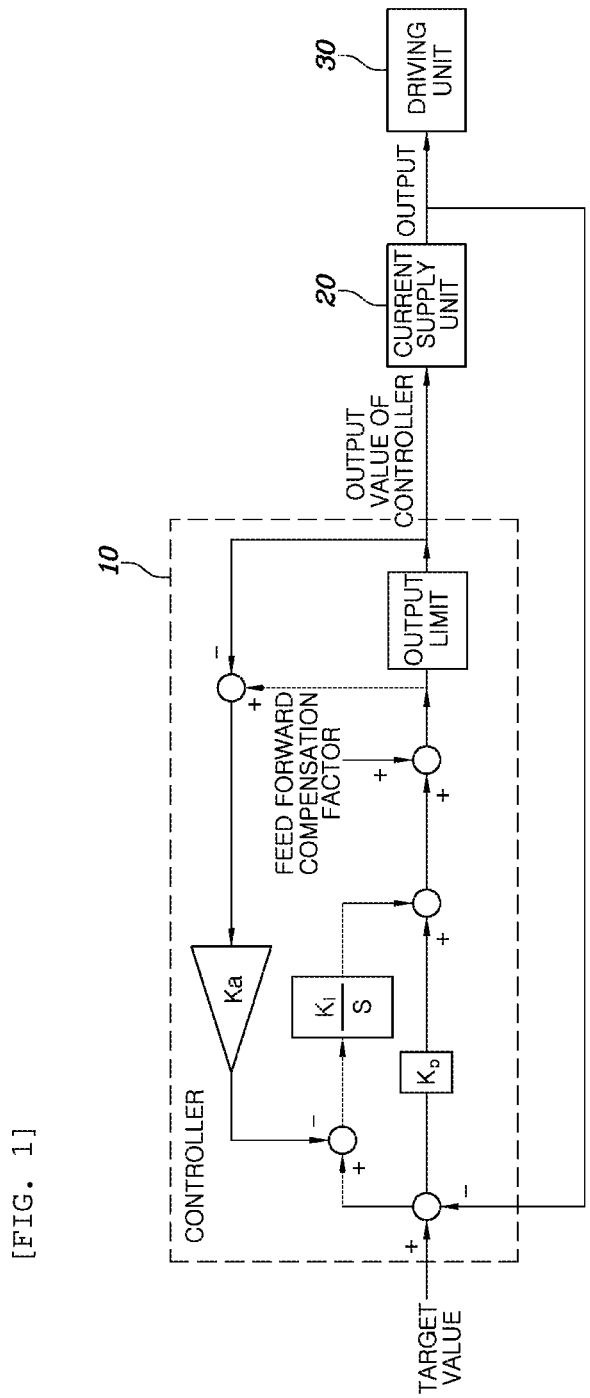
[FIG. 1]

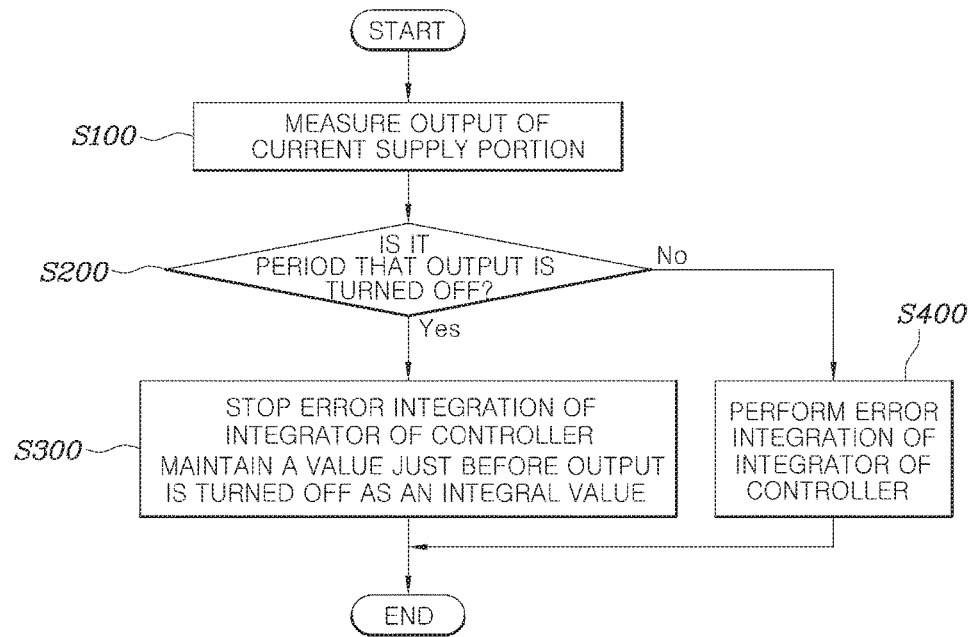
[FIG. 2]

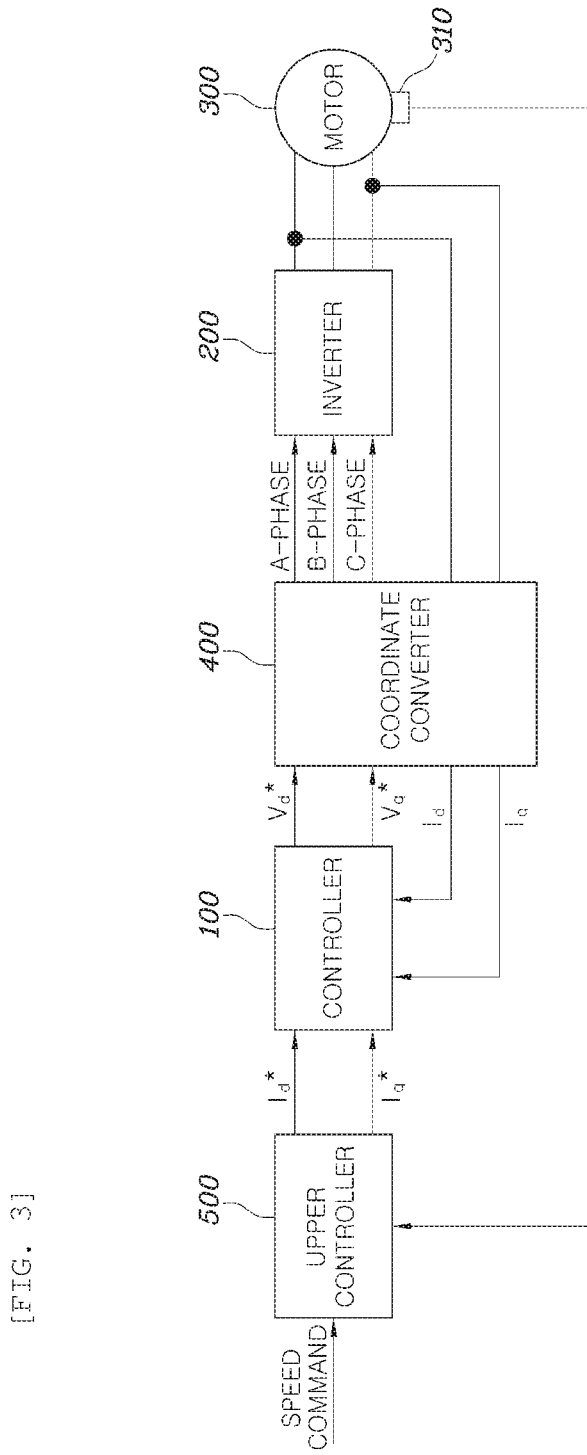
[FIG. 3]

METHOD AND SYSTEM FOR FEEDBACK-CONTROLLING

CROSS-REFERENCE TO RELATED APPLICATIONS

This application claims priority to Korean Patent Application No. 10-2017-0112033, filed on Sep. 1, 2017, which application is hereby incorporated herein by reference.

TECHNICAL FIELD

The present invention relates to a method and a system for feedback-control.

BACKGROUND

A case that needs a control to turn on/off an output in a short-term period for purposes of enhancing efficiency of a system or others becomes a background thereof.

Particularly, for purposes of increasing a rotation speed of a motor, for example, in the motor, a motor inductance for obtaining a sufficient voltage margin in a high-speed operating region is reduced and a three-phase ripple current is increased due to the reduction of the motor inductance, and therefore efficiencies of the motor and an inverter supplying a driving current thereto are reduced.

Particularly, in case of operating a motor at a low speed in response to demand for a small output, a three-phrase current is small and a ripple current increases, and therefore the effect of reduction of efficiency remarkably appears. Further, there was a problem that a switching loss of an IGBT in the inverter occurred and therefore efficiency thereof reduced.

For solving the problems, there developed a technology that repeatedly, in a short-term period, turns on/off a driving current applied to the motor from the inverter in the period that the motor operates at a low speed and therefore saves power consumption thereof. A period of the On/Off and a duty of the On/Off may be set as a value that may secure stability of operation with a minimum of power consumption, and therefore there have the effects that enhance efficiency and stability of operation.

However, in the case that an integration process is included for the feedback control in the feedback-controlling of the driving current in the controller controlling the inverter, there occurred the problems that a value of the driving current measured in the period that the driving current was turned off became o and therefore an error between the measured value and a target value was rapidly increased. A control value was greatly outputted due to the excessively increased error integral value and again due to the foregoing, the driving current outputted from the inverter was severely oscillated.

The foregoing is intended merely to aid in the understanding of the background of the present invention, and is not intended to mean that the present invention falls within the purview of the related art that is already known to those skilled in the art.

SUMMARY

The present invention relates to a method and a system for feedback-control. Particular embodiments relate to a method and a system for feedback-controlling for a stable control in an excessive period that application and blocking of an output thereof generate under a control that repeatedly turns on/off the output in a short-term period.

Embodiments of the present invention solve problems and provide a method and a system for feedback-controlling for a stable control in an excessive period that application and blocking of an output thereof under a control that repeatedly turns on/off the output in a short-term period.

A method for feedback-controlling according to one embodiment includes controlling a current supply unit in a controller so that an output applied to a driving unit from the current supply unit is repeatedly turned on/off by predetermined period and duty, and feedback-controlling of an output value of the controller applying to the current supply unit from the controller so that the output of the current supply unit follows a target value. The feedback-controlling includes an integration control process and stops the integration control process in the period that the current supply unit turns off the output thereof.

The feedback-controlling may calculate and control an error between a measured value measuring the output of the current supply unit and the target value.

The repeatedly turning on/off the output may determine whether it is necessary that the current supply unit turns on/off the output thereof. Only in the case that it is determined that it is necessary to turn on/off the output, the current supply unit may repeatedly turn on/off the output thereof.

A switching element capable of blocking the output applying to the driving unit from the current supply unit is prepared and the repeatedly turning on/off the output may control the On/Off of the switching element in the controller.

In the feedback-controlling, in case of stopping the integration control process in the period that the current supply unit turns off the output thereof, an integral value of an ON state just before the output of the current supply unit is turned off may be maintained as an integral value.

In the feedback-controlling, a feed forward compensation factor added to the output value of the controller and controlling the current supply unit compensates the output in the period that the output of the current supply unit is turned off.

The feedback-controlling may compare the output value of the controller with a predetermined reference value and in the case that the output value of the controller is more than the reference value, define the output value of the controller as the reference value and limit the output of the current supply unit.

The driving unit indicates a motor; the current supply unit indicates an inverter connected to the motor; and the inverter receiving the output value of the controller from the controller may supply a driving current to the motor as an output thereof.

In the feedback-controlling, the controller may apply the output value of the controller to the inverter so that the measured value of the driving current supplying to the motor from the inverter follows the target value.

The period and the duty in the repeatedly turning on/off the output may be preset as a value that power consumption operating the motor becomes minimized.

The feedback-controlling may add the feed forward compensation factor, which compensates the output in the period that the output of the inverter is turned off, to the output value of the controller and control the inverter.

The output values of the controller applying to the inverter from the controller indicate output values of a d-axis voltage and a q-axis voltage; and in the feedback-controlling, the feed forward compensation factor may add values calculated by Equation below to the output values of the d-axis voltage and the q-axis voltage, respectively.

$$V_{q\_FF} = L_d \times \omega_e \times i_{ds} + \Psi \times \omega_e$$

$$V_{d\_FF} = -L_q \times \omega_e \times i_{qs}$$

The method for feedback-controlling may further include feedback-controlling to set the target value so that the motor is equipped with a hall sensor and before the feedback-controlling of the output value of the controller applying to current supply unit, a rotation speed of the motor measured by the hall sensor follows a speed command.

A system for feedback-controlling according to the present invention for achieving the object may include a current supply unit repeatedly turning on/off an output thereof by predetermined period and duty and applying it to a driving unit, and a controller controlling the current supply unit so that the output is repeatedly turned on/off by the predetermined period and duty and feedback-controlling of an output value of the controller applying to the current supply unit so that the output of the current supply unit follows a target value; and the controller may include an integration control process in the feedback control and stop the integration control process in the period that the current supply unit turns off the output thereof.

The driving unit indicates a motor; the current supply unit indicates an inverter; and the inverter receiving the output value of the controller from the controller may supply a driving current to the motor as an output thereof.

According to the method and the system for feedback-controlling of the present invention, it is possible to secure stability of control even under a control to repeatedly, in a short-term period, turn on/off the output thereof. Particularly, it is possible for the output value of the controller to quickly follow the target value in an excessive On/Off period, thereby performing a desired control function. Accordingly, it is also possible to enhance performance and stability of the control and ultimately efficiency of the control system.

BRIEF DESCRIPTION OF THE DRAWINGS

The above and other objects, features and other advantages of the present invention will be more clearly understood from the following detailed description when taken in conjunction with the accompanying drawings, in which:

FIG. 1 is a block diagram illustrating a system for feedback-controlling according to one embodiment of the present invention;

FIG. 2 is a flowchart illustrating a method for feedback-controlling according to one embodiment of the present invention; and FIG. 3 is a block diagram illustrating a system for feedback-controlling in a motor control according to one embodiment of the present invention.

DETAILED DESCRIPTION OF ILLUSTRATIVE EMBODIMENTS

Specifically structural and functional descriptions in exemplary embodiment of the present invention disclosed in the present specification or the present application are illustrated to describe exemplary embodiments of the present invention and therefore, the exemplary embodiments of the present invention may be practiced in various forms and are not to be construed as being limited to the exemplary embodiment of the present invention disclosed in the present specification or the present application.

The exemplary embodiments of the present invention may be variously modified and have various forms and therefore specific exemplary embodiments are illustrated in the accompanying drawings and will be described in detail in the present specification or the present application. However, it is to be understood that the present invention is not limited to the specific exemplary embodiments, but includes all modifications, equivalents, and substitutions included in the spirit and the scope of the present invention.

Terms such as 'first', and/or 'second', etc., may be used to describe various components, but the components are not to be construed as being limited to the terms. The terms are used only to distinguish one component from another component. For example, the 'first' component may be named the 'second' component and the 'second' component may also be similarly named the 'first' component, without departing from the scope of the present invention.

It is to be understood that when one element is referred to as being "connected" to or "coupled" to another element, it may be connected directly to or coupled directly to another element or be connected to or coupled to another component, having the other component intervening therebetween. On the other hand, it is to be understood that when one element is referred to as being "connected directly to" or "coupled directly to" another component, it may be connected to or coupled to another element without the other component intervening therebetween. Other expressions describing a relationship between components, that is, "between", "directly between", "neighboring to", "directly neighboring to" and the like, should be similarly interpreted.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless indicated otherwise, it is to be understood that all the terms used in the specification including technical or scientific terms have the same meaning as those that are generally understood by those skilled in the art. It must be understood that the terms defined by the dictionary are identical with the meanings within the context of the related art, and they should not be ideally or excessively formally defined unless the context clearly dictates otherwise.

Hereinafter, a preferred embodiment of the present invention will be described in detail with reference to the accompanying drawings. The same reference numerals proposed in each drawing denote the same components.

FIG. 1 is a block diagram illustrating a system for feedback-controlling according to one embodiment of the present invention.

Referring to FIGS. 1 and 2, a method for feedback-controlling according to one embodiment of the present invention is characterized by including controlling a current supply unit 20 in a controller 10 so that an output applying to a driving unit 30 from the current supply unit 20 is repeatedly turned on/off by predetermined period and duty, and feedback-controlling of an output value of the controller applying to the current supply unit 20 from the controller 10 so that the output of the current supply unit 20 follows a target value. The feedback-controlling includes an integration control process and stops the integration control process in the period that the current supply unit 20 turns off the output thereof.

Herein, the period means the time until the On/Off is repeated in the case that the output is repeatedly turned on/off and the duty means the time that the output is turned on in one period.

The controller 10 may receive the target value and deliver the output value of the controller to the current supply unit 20. The current supply unit 20 receiving the output value of the controller from the controller 10 may apply an output thereof to the driving unit 30. Herein, the controller 10 may control the current supply unit 20 so that the output applying to the driving unit 30 from the current supply unit 20 is repeatedly turned on/off by the predetermined period and duty.

The current supply unit 20 may repeatedly turn on/off the driving unit 30 for purposes of savings of power consumption or driving efficiency and the like of the driving unit 30. In this case, the period and the duty may be experimentally calculated and preset as the period and the duty of On/Off that power consumption of the current supply unit 20 or the driving unit 30 becomes minimized.

An inner portion of the current supply unit 20 may be equipped with a switching element capable of blocking or applying the output applying to the driving unit 30 from the current supply unit 20. The controller 10 may control On/Off of the switching element of the current supply unit 20 and repeatedly control On/Off of the output applied to the driving unit 30.

The controller 10 may control feedback of the output value of the controller applying to the current supply unit 20 so that the output of the current supply unit 20 follows the target value received. Specifically, the feedback-controlling may calculate and control an error between a measured value measuring the output of the current supply unit 20 and the target value. It is possible to perform various feedback control such as multiplying the error by a coefficient (proportional control) or integrating the error (integration control). The present invention discloses a PI control method as an example, but other than the above, may apply various control methods such as a PID, an IP, a PI & IP mixing controller and the like.

The feedback-controlling includes an integration control process and stops the integration control process in the period that the current supply unit 20 turns off the output thereof. That is, the feedback-controlling performs the integration control in the period that the current supply unit 20 turns on the output thereof and stops the integration control in the period that it turns off the output thereof.

The foregoing is why the error between the measured value measuring the output of the current supply unit 20 and the target value greatly occurs if the measured value of the output becomes o in the period that the output is turned off and the integration control is continuously performed, in the case that the output of the current supply unit 20 is repeatedly turned on/off. That is, it is possible to stop the integration control process, thereby performing a stable control.

In the feedback-controlling, it is possible to maintain, as an integral value, an integral value of an ON state just before the output of the current supply unit 20 is turned off in case of stopping the integration control process in the period that the current supply unit 20 turns off the output thereof. That is, in case of stopping the integration control process, it is possible to maintain the integral value just before the integration control is stopped, thereby feedback-controlling.

FIG. 2 is a flowchart illustrating a method for feedback-controlling according to one embodiment of the present invention.

Referring further to FIG. 2, the method for feedback-controlling according to one embodiment of the present invention may include measuring the output applying to the driving unit 30 from the current supply unit 20 (S100). The method may determine if the output is an On state or an Off state (S200) after the measuring the output (S100). The determining if the output is an On state or an Off state (S200) may determine the On/Off state using a magnitude of the output measuring in the measuring the output (S100); and further determine the On/Off state using an On/Off signal or the predetermined ON/OFF period and duty of the controller 10.

In the case that the output of the current supply unit 20 is an Off state, the controller 10 may stop a process that integrates an error in the feedback control. Herein, the controller 10 may store and maintain, as an integral value, the integral value of the ON state just before the output thereof is turned off. In the case that the output of the current supply unit 20 is an ON state, the controller 10 may perform the integration control process (S400).

That is, the controller 10 may include the integration control process in the feedback control; and in the case that the output of the current supply unit 20 is an ON state, the controller o10 may perform the integration control process (S400) and in the case that the output thereof is an Off state, the controller o10 may stop the integration control process and maintain, as an integral value, the value of the ON state just before (S300).

The repeatedly turning on/off the output may determine whether it is necessary that the current supply unit 20 turns on/off the output thereof; only in the case that it is determined that it is necessary to turn on/off the output thereof, the current supply unit 20 may repeatedly turn on/off the output thereof. When it comes to whether or not it is necessary that the current supply unit 20 performs a control of the On/Off of the output thereof, it may be determined that it is necessary that the current supply unit 20 repeatedly turns on/off the output thereof, in the case that the driving unit 30 operates less than the predetermined value by calculating a magnitude of the target value inputted to the controller 1o, a magnitude of the output value of the controller delivering to the current supply unit 20 from the controller 1o, a magnitude of the output delivering to the driving unit 30 from the current supply unit 20, or a magnitude of the driving value of the driving unit and the like.

In the feedback-controlling, a feed forward compensation factor adding to the output value of the controller and controlling the current supply unit 20 may compensate the output in the period that the output of the current supply unit 20 is turned off. In the case that the current supply unit 20 repeatedly turns on/off the output thereof, the driving unit 30 is operated by the output of the current supply unit 20 in the period that the output of the current supply unit 20 is turned on, but the driving unit 30 is not operated in the period that the output of the current supply unit 20 is turned off.

Accordingly, it is possible to specify the feed forward compensation factor added to the output value of the controller so as to compensate the degree that the driving unit 30 is not operated by the current supply unit 20 in the period that the output is turned off.

The feedback-controlling may compare the output value of the controller with a predetermined reference value, and in the case that the output value of the controller is more than the reference value, specify the output value of the controller as the reference value and limit the output of the current supply unit 20. That is, it is possible to limit the output value of the controller not to be more than the predetermined reference value, thereby limiting the output of the current supply unit 20.

The foregoing is that in the feedback control, since a control may become unstable in the case that the output value of the controller is greatly increased, like the circumstance that an error between the target value and the measured value measuring the output of the current supply unit 20 is greatly increased, the controller 10 may limit the output value of the controller and therefore limit the output of the current supply unit 20 and the operation of the driving unit 30. As a result, it is possible to further secure stability of control.

FIG. 3 is a block diagram illustrating a system for feedback-controlling in a motor control according to one embodiment of the present invention.

Referring to FIG. 3, the method for feedback-controlling of the present invention may be a method for controlling a system for feedback-controlling in a motor control that the driving unit indicates a motor 300; the current supply unit indicates an inverter 200 connected to the motor 300; and the inverter 200 receiving the output value of the controller from the controller 100 supplies a driving current to the motor 300 as an output thereof.

Specifically, the controller 100 may receive current target values (Id*, Iq*) from an upper controller 500 and deliver voltage target values (Vd*, Vq*) to the inverter 200; and the inverter 200 may receive the voltage target values (Vd*, Vq*) and supply a driving current to the motor 300.

A coordinate converter 400 may further be prepared between the controller 100 and the inverter 200. The controller 100 may receive the current target values (Id*, Iq*) of a synchronous coordinate system from the upper controller 500 and deliver the voltage target values (Vd*, Vq*) of the synchronous coordinate system to the coordinate converter 400; and the coordinate converter may convert the voltage target values of the synchronous coordinate system to three-phase voltage target values (a-phase, b-phase, and c-phase) and supply them to the inverter 200. The inverter 200 may supply three-phase driving currents to the motor 300 through an output duty of a PWM in a three-phase switching circuit based on the three-phase voltage target values (a-phase, b-phase, and c-phase) received.

Particularly, in a surface mounted-type permanent magnetic synchronous motor, the driving currents supplying to the motor 300 from the inverter 200 are three-phase currents; and the foregoing may be proportional to a q-axis current of the synchronous coordinate system. Herein, a d-axis current of the synchronous coordinate system may be calculated as o[A].

In feedback-controlling, the controller 100 may apply the output value of the controller to the inverter 200 so that the measured value of the driving current supplying to the motor 300 from the inverter 200 follows the target value. A sensor (not shown) measuring the driving current supplying to the motor 300 from the inverter 200 may be prepared between the inverter 200 and the motor 300. The sensor may measure more than two currents among the three-phase driving currents and again feedback to the controller 100 via the coordinate converter 400. The controller 100 may control feedback so that the actually measured values of the driving currents (Id, Iq) follow the current target values (Id*, Iq*) receiving from the upper controller 500.

The period and the duty in the repeatedly turning on/off the output may be preset as a value that power consumption operating the motor 300 becomes minimized. That is, in case of repeatedly controlling On/Off of the driving current supplying to the motor 300 from the inverter 200, the period and the duty in a repetitive On/Off control may be specified as a value that power consumption of each driving speed of the motor 300 including a switching loss and a loss due to the three-phase current ripple and the like of the inverter 200 becomes minimized. The value may be calculated through an experiment and the like; and the power consumption of each driving speed of the motor 300 may be preset as a map and stored therein.

In the feedback-controlling, it is possible to add the feed forward compensation factor, which compensates the output in the period that the output of the inverter 200 is turned off, to the output value of the controller of the controller 100, thereby controlling the inverter 200.

Since a rotation speed of the motor slightly reduces and the three-phase currents of the motor is a blocked status in the period that the output of the inverter 200 is turned off, the compensation therefor is required at the timing of being again turned on. Specifically, there needs the compensation for a voltage by a mutual inductance and a counter electromotive force generated by rotation of the motor in the period that the output is turned off.

The output values of the controller outputted by the controller 100 may be the output values of the d-axis voltage and the q-axis voltage (Vd*, Vq*) based on the synchronous coordinate system. In the feedback-controlling, the feed forward compensation factor may add values calculated by Equation below to the output values of the d-axis voltage and the q-axis voltage, respectively.

[Equation 1]

$$V_{q\_FF} = L_d \times \omega_e \times i_{ds} + \Psi \times \omega_e$$
$$V_{d\_FF} = -L_q \times \omega_e \times i_{qs}$$

[Equation 1]

$L_d$: d-axis inductance of synchronous coordinate system
$L_q$: q-axis inductance of synchronous coordinate system
$\omega_e$: electrical rotation speed of motor
$\Psi$: constant of counter electromotive force of motor
$i_{ds}$: d-axis current of synchronous coordinate system
$i_{qs}$: q-axis current of synchronous coordinate system The d-axis and the q-axis inductances of the synchronous coordinate system and a constant of the counter electromotive factor required for calculating the feed forward compensation control value are identifiable factors as design parameters of the motor; and the d-axis and the q-axis currents of the synchronous coordinate system and the electrical rotation speed of the motor are factors measurable through the sensor. For example, the electrical rotation speed of the motor may be measured through a hall sensor prepared in the motor. Accordingly, it is possible to input the speed value and the current value changed at the timing that the driving current is blocked (an Off period) and then again supplied (an ON period), thereby calculating a voltage generated by the rotation of the permanent magnetic in the motor.

For reference, in the permanent magnetic synchronous motor, an equation of the d-axis and the q-axis currents-voltages in the three-phase synchronous coordinate system may be represented as follows.

[Equation 2]

$$V_q = R_s I_q + L_q \frac{dI_q}{dt} + L_d \omega_e I_d + \psi \omega_e$$

$$V_d = R_s I_d + L_d \frac{dI_d}{dt} - L_q \omega_e I_q$$

$V_d$: d-axis voltage of synchronous coordinate system
$V_q$: q-axis voltage of synchronous coordinate system
$I_d$: d-axis current of synchronous coordinate system
$I_q$: q-axis current of synchronous coordinate system
$R_s$: phase resistance of motor
$L_d$: d-axis inductance of synchronous coordinate system
$L_q$: q-axis inductance of synchronous coordinate system
$\omega_e$: electrical rotation speed of motor
$\Psi$: constant of counter electromotive force of motor In Equation 2, a linear part of Equation 3 below indicates a value calculated by the controller. Accordingly, a non-linear part of Equation 2 is compensated by the feed forward compensation factor calculated in Equation 1.

[Equation 3]

$$V_q = R_s I_q + L_q \frac{dI_q}{dt}$$

$$V_d = R_s I_d + L_d \frac{dI_d}{dt}$$

The motor 300 may be equipped with a hall sensor 310. The hall sensor 310 may measure the electrical rotation speed of the motor 300 and as a result, extract the rotation speed of the real motor 300.

Before the feedback-controlling, the present invention may further include feedback-controlling to set a target value so that the rotation speed of the motor 300 measured by the hall sensor 310 follows a speed command. That is, the upper controller 500 may be a speed controller and may receive the speed command and control feedback so that the rotation speed of the motor 300 measured by the hall sensor 310 follows the speed command.

In case of feedback-controlling in the upper controller 500 so that the rotation speed of the motor 300 follows the speed command, the integration control may not be stopped even in the period that the output of the inverter 200 is turned off. The foregoing is why the output of the inverter 200 is turned on/off in a very short-term period even though it is turned off and therefore there is little error with respect to the actually measured value of the rotation speed of the motor 300.

A system for feedback-controlling according to one embodiment of the present invention may include a current supply unit repeatedly turning on/off an output thereof by predetermined period and duty and applying it to a driving unit, and the controller controlling the current supply unit so that the output is repeatedly turned on/off by the predetermined period and duty and feedback-controlling of an output value of the controller applying to the current supply unit so that the output of the current supply unit follows a target value; and the controller includes an integration control process in the feedback control and stops the integration control process in the period that the current supply unit turns off the output thereof.

The driving unit indicates a motor; the current supply unit indicates an inverter; and the inverter receiving the output value of the controller from the controller may supply a driving current to the motor as an output thereof.

A description of the system for feedback-controlling will be hereinafter omitted because of the duplicate description of the method for feedback-controlling.

Although the specific embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for feedback-controlling, the method comprising:
    controlling a current supply unit using a controller so that an output applied to a driving unit from the current supply unit is repeatedly turned on/off by a predetermined period and duty cycle; and
    feedback-controlling, by the controller, an output value of the controller applied to the current supply unit so that the output of the current supply unit follows a target value, wherein the feedback-controlling comprises an integration control process that integrates an error between the target value and the output of the current supply unit, and the integration control process is stopped in a period that the current supply unit turns off the output applied to the driving unit, wherein the feedback-controlling comprises adding a feed forward compensation factor to the output value of the controller and wherein controlling the current supply unit compensates the output in the period that the output of the current supply unit is turned off.

2. The method according to claim 1, wherein the feedback-controlling comprises calculating and controlling an error between a measured value measuring the output of the current supply unit and the target value.

3. The method according to claim 1, wherein repeatedly turning on/off the output comprises:
    determining whether or not it is necessary that the current supply unit turns on/off the output thereof; and
    repeatedly turning on/off the output of the current supply unit only when it is determined that it is necessary to turn on/off the output.

4. The method according to claim 1, wherein repeatedly turning on/off the output comprises controlling on/off of a switching element capable of blocking the output applied to the driving unit from the current supply unit.

5. The method according to claim 1, wherein the feedback-controlling comprises maintaining an integral value of an ON state just before the output of the current supply unit is turned off.

6. The method according to claim 1, wherein the feedback-controlling comprises comparing the output value of the controller with a predetermined reference value, and when the output value of the controller is more than the reference value, specifying the output value of the controller as the reference value and limiting the output of the current supply unit.

7. A method for controlling a motor, the method comprising:
    controlling an inverter using a controller so that an output applied to a motor from the inverter is repeatedly turned on/off by a predetermined period and duty cycle; and feedback-controlling, by the controller, an output value of the controller applied to the inverter so that the output of the inverter follows a target value, wherein the feedback-controlling comprises an integration control process that integrates an error between the target value and the output of the inverter, and the integration control process is stopped in a period that the inverter turns off the output applied to the motor, wherein the feedback-controlling comprises adding a feed forward compensation factor to the output value of the controller, the feed forward compensation factor for compensating the output in the period that the output of the inverter is turned off, and controlling the inverter.

8. The method according to claim 7, wherein the feedback-controlling comprises applying the output value of the controller to the inverter so that a measured value of a driving current supplied to the motor from the inverter follows the target value.

9. The method according to claim 7, wherein the period and the duty cycle in the repeatedly turning on/off the output applied to the motor from the inverter are preset as a value that power consumption operating the motor becomes minimized.

10. The method according to claim 7, wherein the output value applied to the inverter from the controller indicates output values of a d-axis voltage and a q-axis voltage;

wherein the feed forward compensation factor adds values calculated by Equation 1 to output values of the d-axis voltage and the q-axis voltage, respectively; and wherein Equation 1 is $$V_{q\_FF} = L_d \times \omega_e \times i_{ds} + \Psi \times \omega_e$$

$$V_{d\_FF} = -L_q \times \omega_e \times i_{qs}$$

11. The method according to claim 7, wherein the motor is equipped with a hall sensor, the method further comprising measuring a rotation speed of the motor using the hall sensor and setting the target value so that the rotation speed of the motor measured by the hall sensor follows a speed command.

12. A system, comprising:
a current supply unit including an output configured to be repeatedly turned on/off by a predetermined period and duty cycle, the output of the current supply unit configured to be applied to a driving unit; and
a controller configured to control the current supply unit so that the output of the current supply unit is repeatedly turned on/off by the predetermined period and duty cycle, the controller configured to feedback-control an output value of the controller applied to the current supply unit so that the output of the current supply unit follows a target value, wherein the controller is configured to perform an integration control process in the feedback-control, the integration control process comprising a process that integrates an error between the target value and the output of the current supply unit, the controller further configured to stop the integration control process in a period that the output of the current supply unit is turned off, wherein the controller is configured to feedback-control comprising to add a feed forward compensation factor to the output value of the controller and to control the current supply unit compensating the output in the period that the output of the current supply unit is turned off.

13. The system according to claim 12, wherein the current supply unit comprises an inverter.

14. The system according to claim 13, further comprising a motor coupled to the output of the inverter, the motor serving as the driving unit, wherein the inverter is configured to receive the output value from the controller and to supply a driving current to the motor.

15. The system according to claim 14, wherein the motor is equipped with a hall sensor that is configured to measure a rotation speed of the motor.

* * * * *